3,786,062
22-DEHYDRO-25-HYDROXYCHOLECALCIFEROL AND PROCESS FOR PREPARING SAME

Collin H. Schroeder and Richard J. Lechnir, Madison, Wis., Peter G. Cleveland, Chicago, Ill., and Hector F. De Luca and Philip H. Derse, Madison, Wis., assignors to Wisconsin Alumni Research Foundation, Madison, Wis.
No Drawing. Filed Feb. 16, 1973, Ser. No. 332,882
Int. Cl. C07c 171/10
U.S. Cl. 260—397.2      1 Claim

ABSTRACT OF THE DISCLOSURE 22-dehydro-25-hydroxycholecalciferol and process for preparing the same from 3β-acetoxy-22,23-bisnorcholenaldehyde. 22-dehydro-25-hydroxycholecalciferol is characterized by antirachitic activity substantially greater than exhibited by vitamin $D_3$.

---

This invention relates to a new compound which possesses antirachitic activity.

More specifically this invention relates to 22-dehydro-25-hydroxycholecalciferol and to methods for preparing such compound.

The character and activity of the D-vitamins (vitamin $D_2$ and $D_3$) is well known. More recently several derivatives of the D-vitamins have been found which exhibit greater antirachitic activity than the D-vitamins themselves or which are specifically active at certain sites within the body to induce and promote certain specific functions. For example, 25-hydroxycholecalciferol (25-HCC) and 25-hydroxyergocalciferol (25-HEC) have been suggested as the major circulating derivatives of vitamins $D_3$ and $D_2$ respectively in the body. Other derivatives, such as 1,25-dihydroxycholecalciferol (U.S. Letters Patent No. 3,697,559) and 25,26-dihydroxycholecalciferol (see "25,26-Dihydroxycholecalciferol, a Metabolite of Vitamin $D_3$ With Intestinal Transport Activity," T. Suda, H. F. De Luca et al., Biochemistry, 9, 4776 (1970)) induce intestinal calcium absorption or calcium transport in the intestines.

A new compound has now been synthetically produced which exhibits substantially greater antirachitic activity than vitamin $D_3$. This compound has been identified as 22 - dehydro - 25-hydroxycholecalciferol ($\Delta^{22}$-25-HCC).

Preparation of $\Delta^{22}$-25-HCC

The following schematic diagram is illustrative of the method of this invention for preparing 22-dehydro-25-hydroxycholecalciferol from readily available starting material. The schematic is intended to merely indicate the synthetic pathways followed in the process, the detailed procedures being described hereinafter with reference to the said schematic.

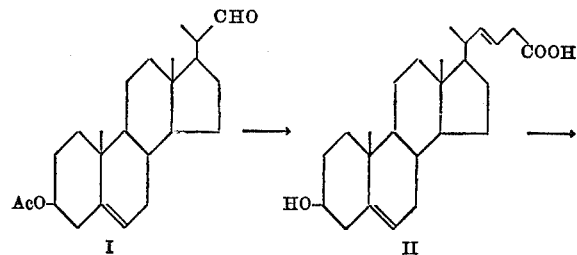

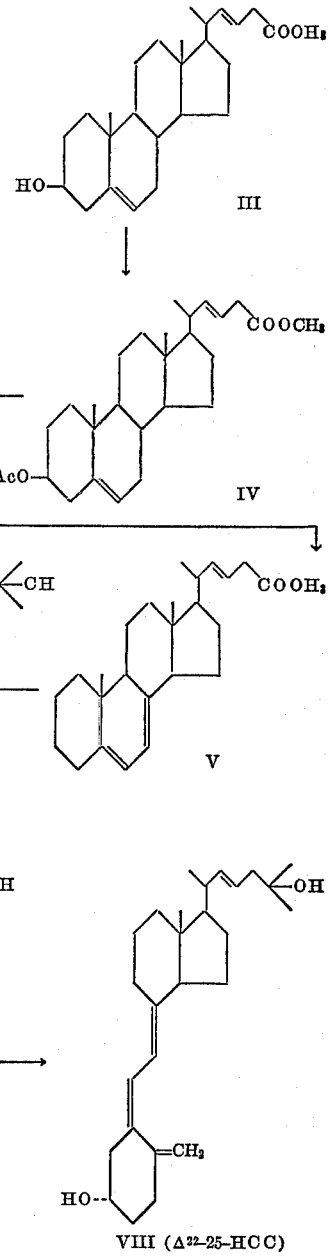

The readily available 3β-acetoxy-22,23-bisnorcholenaldehyde (I) (see T. C. McMorris, J. Org. Chem., 35, 458 (1970)) was reacted with the phosphonium ylid prepared from 2-carboxyethyltriphenyl phosphonium bromide (see D. B. Denney and L. C. Smith, J. Org. Chem., 27, 3404 (1962)) to yield cis-trans $\Delta^{22}$-homocholenic acid (II).

3β-acetoxy-$\Delta^{22}$-homocholenic acid methyl ester (IV) was prepared from II by methylation of the carboxylic acid according to the procedure of Alvarez F. S. Alvarez and A. N. Watt, J. Org. Chem., 33, 2143 (1968)) for bisnorcholenic acid followed by acetylation of III with acetic acid anhydride in pyridine solution. It was found advantageous to block the 3-hydroxy position with acetate prior to bromination.

Bromination of IV with 1,3-dibromo-5,5-dimethylhydantoin followed by dehydrohalogenation with trimethyl phosphite according to the procedure of Hunziker and Mullner (Helv. Chim. Acta, 41, 70 (1958)) produced a mixture of the $\Delta^{4,6,22}$ and $\Delta^{5,7,22}$ isomers. The $\Delta^{5,7,22}$ isomer (V) was separated from the $\Delta^{4,6,22}$ isomer by fractional crystallization.

Treatment of the $\Delta^{5,7,22}$ homoester (V) with methyl magnesium bromide gave the expected 7-dehydro-$\Delta^{22}$-25-hydroxycholesterol (VI). Ultraviolet irradiation of VI at 300 m$\mu$ in ethanol-ether solution gave the previtamin D-like compound, pre-$\Delta^{22}$-25-hydroxychlecalciferol (VII) which after isomerization afforded $\Delta^{22}$-25-hydroxycholecalciferol (VII).

Following is a detailed description of the process described broadly above.

$\Delta^{22}$-homocholenic acid (II)

A solution consisting of 5.2 g. (14 mmoles) of 3$\beta$-acetoxy-22,23-bisnorcholenaldehyde (I) and 7.5 g. (18 mmoles) of 2-carboxyethyltriphenyl phosphonium bromide in 80 ml. of dry dimethylsulfoxide-toluene (1:1) solution was cooled to about 5° C. and added rapidly to a well stirred chilled suspension (ice bath) of 1.04 g. (43.3 mmoles) of sodium hydride in 10 ml. of dry toluene. The addition and subsequent reaction were carried out under dry nitrogen. The reaction mixture was stirred for 16 hours at room temperature. After decomposing the excess sodium hydride with a small amount of methanol the reaction mixture was poured into water. The crude product was removed by benzene extraction which was washed successively with water and saturated sodium chloride solution and then dried over anhydrous sodium sulfate.

The majority of the triphenylphosphine oxide was removed by solvent partition. The crude product was dissolved in 140 ml. methanol containing 20 ml. of 5% aqueous sodium hydroxide. The solution was first mixed with 200 ml. of diethyl ether and then 200 ml. water. The ether layer was discarded and the aqueous methanol solution washed additionally with 2,200 ml. portions of the ether. The alkaline solution was diluted with 300 ml. of water and acidified with 25 ml. of 20% sulfuric acid. The crude product was recovered by ether extraction. The product was purified by crystallization from methanol. The yield was about 80% based on the starting aldehyde. The infrared spectrum (KBr) of the material had carbonyl absorbance at 5.88$\mu$ and was otherwise commensurate with the assigned structure. No absorbance due to acetoxy was present.

Analysis.—Calcd. for $C_{25}H_{38}O_3$ (percent): C, 77.67; H, 9.91. Found (percent): C, 78.08; H, 10.14.

The molecular weight, 386, was verified by mass spectral analysis. GLC analysis indicated the presence of both $\Delta^{22}$ cis and trans isomers in a ratio of about 1:4.

$\Delta^{22}$-homocholenic acid methyl ester (III)

The methyl ester of II was preperad accordinng to the procedure of Alvarez (supra) for the preparation of 22,23-bisnorcholenic acid methyl ester.

A solution consisting of 2.80 g. (7.25 mmoles) of II, 1.5 g. of sodium bicarbonate and 2.0 g. of methyl iodide in 15 ml. of dry N,N-dimethylacetamide was stirred at room temperature in the dark for at least 48 hours. The reaction mixture was added slowly to 300 ml. of 10% sodium chloride solution. The crude product was removed by filtration, washed with water and dried. The crude product was purified using silica gel column chromatography with a benzene-chloroform eluent. The yield was greater than 90%. The molecular weight, 400, was verified by mass spectral analysis.

3$\beta$-acetoxy-$\Delta^{22}$-homocholenic acid methyl ester (IV)

To 10 ml. of dry pyridine was added 2.26 g. (5.65 mmoles) of III and 10 ml. of acetic anhydride. The solution was allowed to stand at room temperature for 16 hours. The reaction mixture was poured into 200 ml. of water and the product removed by ether extraction. The ether solution was washed with several portions of water and finally with saturated sodium chloride solution and dried over sodium sulfate. The ether was removed under vacuum and the residue purified by column chromatography with silica gel (benzene eluent). The yield was nearly quantitative. The infrared spectrum was consistent with the assigned structure.

3$\beta$-acetoxy-7-dehydro-$\Delta^{22}$-homocholenic acid methyl ester (V)

To 25 ml. of dry benzene was added 1.75 g. (3.96 mmoles) of IV, 0.630 g. (2.20 mmoles) of 1,3-dibromo-5,5-dimethylhydantoin and 25 ml. of dry n-hexane. The mixture was heated at reflux under nitrogen for 4 minutes. The reaction mixture was cooled and the 5,5-dimethylhydantoin was removed by filtration. The resulting solution was concentrated to dryness under vacuum. A solution of the residue in 10 ml. of dry xylene was added dropwise to a heated solution (130 C.) of 10 ml. of dry xylene and 1.8 ml. of trimethylphosphite under nitrogen. The solution was heated at 130° C. for 90 minutes. The reaction mixture was concentrated under vacuum. The residue was dissolved in benzene and reconcentrated under vacuum to facilitate removal of the trimethylphosphite. The product was partially purified by column chromatography on silica gel (benzene eluent). The pure fractions (as based upon thin layer chromatographic estimation) were combined and the solvent removed under vacuum. The residue was chiefly a mixture of the $\Delta^{4,6,22}$ and $\Delta^{5,7,22}$ isomers. Separation of the $\Delta^{5,7,22}$ isomer (V) was accomplished by fractional crystallization from a 1:1 mixture of ether - n - hexane. The infrared spectrum (KBr) was consistent with the assigned structure. The ultraviolet spectrum had the characteristic absorbance maxima for the $\Delta^{5,7}$ conjugated steroid system $$\lambda_{max.}^{Alc} \; 272, \; 282, \; 294$$

7-dehydro-$\Delta^{22}$-25-hydroxycholesterol (VI)

To a stirred solution of 20 mmoles of methyl magnesium iodide in 50 ml. of dry ether was added slowly 0.450 g. (1.02 mmoles) of V in 20 ml. of dry ether. White solid precipitated on the addition of VI. After 30 minutes an additional 10 mmoles of methyl magnesium iodide was added and the reaction stirred for an additional 60 minutes.

The reaction mixture was poured into 10 ml. of saturated ammonium chloride solution, diluted with ice water and extracted with ether. The ether extract was washed with water and saturated sodium chloride solution and dried over anhydrous sodium sulfate. The product was purified by column chromatography using silica gel (chloroform eluent). The infrared spectrum was consistent with the assigned structure. The ultraviolet spectrum, $$\lambda_{max.}^{Alc} \; 272, \; 282, \; 294$$

verified the presence of the $\Delta^{5,7}$ steroid diene system.

$\Delta^{22}$-25-hydrocholecaliferol (VIII)

A solution of 0.070 g. of VI in 200 ml. methanol-ether (1:5) solution was irradiated with 3000 A. ultraviolet light for 10 minutes at about 15°. The irradiation was carried out in a Rayonet (manufactured by the The Southern New England Ultraviolet Co., Middletown, Conn.) photochemical reactor with a quartz reaction vessel fitted with a nitrogen ebulator and water cooling coil.

The irradiated solution was evaporated under vacuum to about 2 ml. and finally to dryness under a stream of nitrogen. It was estimated that about 30% conversion had occurred (based upon the antimony trichloride color reaction of Nield et al., J. Biol. Chem., 136, 73 (1940). Pre-$\Delta^{22}$-25-hydroxycholecalciferol (VII) was isolated by column chromatography from a silicic acid multibore column as described by Fisher et al. in Anal. Biochem., 9, 303 (1966).

The column was eluted with an ether-n-hexane gradient according to the procedures of Neville and De Luca, Biochemistry, 5, 2201 (1966). Consecutive 5 ml. fractions were collected. Fractions containing VII, isolated by their ultraviolet absorbance at 260 m$\mu$, were combined for additional purification.

About 3 mg. of VII isolated from the silicic acid chromatography was isomerized to $\Delta^{22}$-25-hydroxycholecalciferol (VIII) by heating at 60° in benzene solution under nitrogen for 12 hours. The benzene was removed and the product acetylated in pyridine solution with acetic acid anhydride. The isolated diacetate was purified by column chromatography using silver nitrate impregnated silicic acid (ether-n-hexnae). Both the cis-$\Delta^{22}$-25-HCC diacetate and the trans-$\Delta^{22}$-25-HCC diacetate were separated and estimated to be greater than 90% pure. The cis and trans diacetates of VIII were hydrolyzed with lithium aluminum hydride in ether solution to remove the acetyl group as described by Blunt and De Luca in Biochemistry, 8, 671 (1969).

The ultraviolet spectrum of the isomers of VIII were consistent with the assigned structure, $$\lambda_{max}^{Alc}. 265$$

The molecular weight, 398, was verified by mass spectral analysis. Gas-liquid chromatography of each isomer showed two peaks (pyro and isopyro) resulting from thermal rearrangement as described for cholecalciferol and its metabolites by Blunt et al., Biochemistry, 7, 3317 (1968).

In the foregoing description wherever reference is made to silicic acid in column chromatography the silicic acid used was Bio-Rad silicic acid, HA, −325 mesh obtained from California Corp. for Biochemical Research, Los Angeles, Calif. Also wherever silica gel is referred to the silica gel used was Silica Gel 60 (70–230 mesh ASTM) available from E. Merck & Co., Darmstadt, Germany.

Biological activity of cis-$\Delta^{22}$-25-HCC and trans-$\Delta^{22}$-25-HCC

The cis and trans isomers of $\Delta^{22}$-25-HCC were tested for antirachitic activity using the rat "line" test described in U.S. Pharmacopeia, XV, 889 (Mack Publishing Co., 1955) except that the test material (the isomers) was divided into four equal aliquots and fed on the first four successive days during the assay period.

Based upon the results obtained in the "line" tests the cis- and trans-$\Delta^{22}$-25-HCC isomers were each calculated to have about 160 IU antirachitic activity per microgram. This activity is significantly greater than that exhibited by vitamin $D_3$ which was calculated to be and is recognized to have about 40 IU of antirachitic activity per microgram.

Having thus described the invention what is claimed is:
1. 22-dehydro-25-hydroxycholecalciferol.

References Cited
UNITED STATES PATENTS

| | | | |
|---|---|---|---|
| 3,565,924 | 2/1971 | De Luca et al. | 260—397.2 |
| 3,585,221 | 6/1971 | De Luca et al. | 260—397.2 |
| 3,702,810 | 11/1972 | De Luca et al. | 260—397.2 |

HENRY A. FRENCH, Primary Examiner